US011527365B2

(12) United States Patent
Tanabe et al.

(10) Patent No.: US 11,527,365 B2
(45) Date of Patent: Dec. 13, 2022

(54) ELECTROLYTIC SOLUTION FOR ELECTROLYTIC CAPACITOR, AND ELECTROLYTIC CAPACITOR

(71) Applicant: SANYO CHEMICAL INDUSTRIES, LTD., Kyoto (JP)

(72) Inventors: Fumiyuki Tanabe, Kyoto (JP); Takahiro Shiba, Kyoto (JP); Yoshihiko Akazawa, Kyoto (JP); Takao Mukai, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 973 days.

(21) Appl. No.: 16/311,167

(22) PCT Filed: Jun. 28, 2017

(86) PCT No.: PCT/JP2017/023800
§ 371 (c)(1),
(2) Date: Dec. 19, 2018

(87) PCT Pub. No.: WO2018/003876
PCT Pub. Date: Jan. 4, 2018

(65) Prior Publication Data
US 2019/0326062 A1 Oct. 24, 2019

(30) Foreign Application Priority Data
Jun. 29, 2016 (JP) .............................. JP2016-128301

(51) Int. Cl.
*H01G 9/035* (2006.01)
*H01G 9/145* (2006.01)

(52) U.S. Cl.
CPC ............ *H01G 9/035* (2013.01); *H01G 9/145* (2013.01)

(58) Field of Classification Search
CPC .............................. H01G 9/145; H01G 9/035
See application file for complete search history.

(56) References Cited

U.S. PATENT DOCUMENTS

| | | | | |
|---|---|---|---|---|
| 5,658,686 A | * | 8/1997 | Akashi | H01M 6/22 252/62.2 |
| 5,661,629 A | * | 8/1997 | MacFarlane | H01G 9/025 361/503 |
| 6,468,317 B1 | * | 10/2002 | Strange | H01G 9/0036 29/25.03 |
| 6,522,524 B1 | * | 2/2003 | Feger | H01G 11/56 361/506 |
| 2002/0102464 A1 | * | 8/2002 | Yoshida | H01G 11/56 429/300 |
| 2010/0053847 A1 | | 3/2010 | Tani et al. | |

FOREIGN PATENT DOCUMENTS

| | | |
|---|---|---|
| CN | 101261900 | 9/2008 |
| CN | 101278364 | 10/2008 |
| JP | 64-077110 | 3/1989 |
| JP | H0745482 | 2/1995 |
| JP | 11-074161 | 3/1999 |
| JP | 2000058396 | 2/2000 |
| JP | 2001223136 | 8/2001 |
| JP | 2002208311 | 7/2002 |
| JP | 2002280267 | 9/2002 |
| JP | 2002324734 A | * 11/2002 |
| JP | 2003246824 | 9/2003 |

OTHER PUBLICATIONS

"Office Action of Japan Counterpart Application", dated Jan. 26, 2021, p. 1-p. 2.
"International Search Report (Form PCT/ISA/210) "of PCT/JP2017/023800, dated Sep. 12, 2017, with English translation thereof, pp. 1-4.
"Office Action of China Counterpart Application," dated Dec. 13, 2019, p. 1-p. 7.
"Search Report of Europe Counterpart Application", dated Feb. 10, 2020, p. 1-p. 8.
"Office Action of Taiwan Counterpart Application," with English translation thereof, dated Feb. 25, 2019, p. 1-p. 13.
"Office Action of China Counterpart Application", dated Aug. 5, 2020, with English translation thereof, p. 1-p. 13.

* cited by examiner

*Primary Examiner* — David M Sinclair
(74) *Attorney, Agent, or Firm* — JCIPRNET

(57) ABSTRACT

An electrolytic solution for an electrolytic capacitor contains: an electrolytic solution additive for an electrolytic capacitor (B) containing a polymer (A) that has a (meth) acrylic monomer (a) as an essential component; an organic solvent (C) having a hydroxyl group concentration higher than 10 mmol/g; and an electrolyte (D), the electrolytic solution for an electrolytic capacitor being characterized in that the content of a (meth)acrylic monomer having a hydroxyl group (a1) is 60-100 wt % of the total monomers constituting the polymer (A).

6 Claims, No Drawings

ELECTROLYTIC SOLUTION FOR ELECTROLYTIC CAPACITOR, AND ELECTROLYTIC CAPACITOR

CROSS-REFERENCE TO RELATED APPLICATION

This application is a 371 of international application of PCT application serial no. PCT/JP2017/023800, filed on Jun. 28, 2017, which claims the priority benefit of Japan application no. 2016-128301, filed on Jun. 29, 2016. The entirety of each of the above-mentioned patent applications is hereby incorporated by reference herein and made a part of this specification.

TECHNICAL FIELD

The present invention relates to an electrolytic solution for an electrolytic capacitor and an electrolytic capacitor including the electrolytic solution.

BACKGROUND ART

Electrolytic capacitors are widely used in various electrical appliances and electronic products, and applications thereof are diverse, for example, charge accumulation, noise removal, and phase adjustment. In recent years, in order for an electrolytic capacitor to operate at a higher drive voltage, there has been an increasing need to improve a withstand voltage, and various improvements have been attempted.

For example, Patent Literature 1 discloses a technology for improving a withstand voltage by adding a polyacrylic acid to an electrolytic solution containing ethylene glycol as a main solvent.

CITATION LIST

Patent Literature

[Patent Literature 1]
Japanese Unexamined Patent Application Publication No. H7-45482

SUMMARY OF INVENTION

Technical Problem

However, in the method described in Patent Literature 1, although a withstand voltage is improved, there is a problem of the conductivity greatly decreasing. An objective of the present invention is to provide an electrolytic solution for an electrolytic capacitor having an excellent balance between both a withstand voltage and conductivity.

Solution to Problem

The inventors conducted studies in order to achieve the above objective, and thus developed the present invention.

That is, the present invention provides an electrolytic solution for an electrolytic capacitor including an electrolytic solution additive for an electrolytic capacitor (B) including a polymer (A) containing a (meth)acrylic monomer (a) as an essential constituent component (constituent monomer), an organic solvent (C) having a hydroxyl group concentration of higher than 10 mmol/g, and an electrolyte (D), and in which a content of a (meth)acrylic monomer (a1) having a hydroxy group is 60 to 100 wt % with respect to a total weight of all monomers constituting the polymer (A); and an electrolytic capacitor including the electrolytic solution for an electrolytic capacitor.

Advantageous Effects of Invention

It is possible to provide an electrolytic solution for an electrolytic capacitor having both an excellent withstand voltage and conductivity using the electrolytic solution of the present invention.

DESCRIPTION OF EMBODIMENTS

An electrolytic solution for an electrolytic capacitor of the present invention includes an electrolytic solution additive for an electrolytic capacitor (B) including a polymer (A) containing a (meth)acrylic monomer (a) as an essential constituent component (constituent monomer), an organic solvent (C) having a hydroxyl group concentration of higher than 10 mmol/g, and an electrolyte (D) as essential components.

The electrolytic solution additive for an electrolytic capacitor (B) in the present invention includes the polymer (A) containing the (meth)acrylic monomer (a) as an essential constituent component (constituent monomer).

In the polymer (A) in the present invention, a content of a (meth)acrylic monomer (a1) having a hydroxy group as the (meth)acrylic monomer (a) is 60 to 100 wt % with respect to a total weight of all monomers constituting the polymer (A). When a content of the (meth)acrylic monomer (a1) having a hydroxy group is less than 60 wt % with respect to a total weight of all monomers constituting the polymer (A), a withstand voltage deteriorates.

In addition, in consideration of a withstand voltage, a content of the (meth)acrylic monomer (a1) is preferably 65 to 100 wt %, more preferably 70 to 100 wt %, and particularly preferably 90 to 100 wt % with respect to a total weight of all monomers constituting the polymer (A).

Here, a (meth)acrylic monomer (a2) having a carboxy group to be described below is not included as the (meth)acrylic monomer (a1) having a hydroxy group.

Here, in this specification, "(meth)acryloyl" refers to both or either of "acryloyl" and "methacryloyl," "(meth)acrylate" refers to both or either of "acrylate" and "methacrylate," "(meth)acrylic" refers to both and either of "acrylic" and "methacrylic," and "(meth)acryloyloxy" refers to both or either of "acryloyloxy" and "methacryloyloxy."

Any (meth)acrylic monomer (a1) having a hydroxy group in the present invention can be used without any particular limitation as long as it has a hydroxy group and a (meth)acryloyl group.

Specific examples of the (meth)acrylic monomer (a1) include a hydroxyalkyl (meth)acrylate (a11) having 4 to 12 carbon atoms, an adduct (a12) obtained by adding a lactone having 2 to 12 carbon atoms to the hydroxyalkyl (meth)acrylate (a11) having 4 to 12 carbon atoms, an adduct (a13) obtained by adding an alkylene oxide having 2 to 4 carbon atoms to the hydroxyalkyl (meth)acrylate (a11) having 4 to 12 carbon atoms, a (meth)acrylate (a14) having a hydroxy group having 6 to 15 carbon atoms and a cyclic skeleton, an adduct (a15) obtained by adding a lactone having 2 to 12 carbon atoms to the (meth)acrylate (a14) having a hydroxy group having 6 to 15 carbon atoms and a cyclic skeleton, and an adduct (a16) obtained by adding an alkylene oxide having 2 to 4 carbon atoms to the (meth)acrylate (a14) having a hydroxy group having 6 to 15 carbon atoms and a cyclic skeleton.

Here, the carbon atoms of (a11) here also include carbon atoms of the (meth)acryloyl group.

Examples of the hydroxyalkyl (meth)acrylate (a11) having 4 to 12 carbon atoms include a monohydroxyalkyl (meth)acrylate (a111) having 4 to 12 carbon atoms, a dihydroxyalkyl (meth)acrylate (a112) having 4 to 12 carbon atoms and a trihydroxyalkyl (meth)acrylate (a113) having 4 to 12 carbon atoms.

Examples of the monohydroxyalkyl (meth)acrylate (a111) having 4 to 12 carbon atoms include 2-hydroxyethyl (meth)acrylate (2-hydroxyethyl acrylate and/or 2-hydroxyethyl methacrylate), 2-hydroxypropyl (meth)acrylate, 3-hydroxypropyl (meth)acrylate, 2-hydroxy-1-methylethyl (meth)acrylate, 2-hydroxybutyl (meth)acrylate, 3-hydroxybutyl (meth)acrylate, 4-hydroxybutyl (meth)acrylate, 2-hydroxy-1-methylpropyl (meth)acrylate, 2-hydroxy-2-methylpropyl (meth)acrylate, 3-hydroxy-1-methylpropyl (meth)acrylate, 3-hydroxy-2-methylpropyl (meth)acrylate, 6-hydroxyhexyl (meth)acrylate, 7-hydroxyheptyl (meth)acrylate and 8-hydroxyoctyl (meth)acrylate.

Examples of the dihydroxyalkyl (meth)acrylate (a112) having 4 to 12 carbon atoms include glycerol mono (meth)acrylate.

Examples of the trihydroxyalkyl (meth)acrylate (a113) having 4 to 12 carbon atoms include pentaerythritol monoacrylate.

Examples of the lactone having 2 to 12 carbon atoms added to the hydroxyalkyl (meth)acrylate (a11) having 4 to 12 carbon atoms include acetolactone, propiolactone, butyrolactone, valerolactone, caprolactone and laurolactone.

In consideration of the conductivity of the electrolytic solution, the number of moles of such a lactone added is preferably 1 to 15 mol.

For the lactones added, one type may be used alone or two or more types may be used in combination.

Examples of the adduct (a12) obtained by adding a lactone having 2 to 12 carbon atoms to the hydroxyalkyl (meth)acrylate (a11) having 4 to 12 carbon atoms include an adduct obtained by adding 2 mol of caprolactone to 2-hydroxyethyl (meth)acrylate and an adduct obtained by adding 5 mol of caprolactone to 2-hydroxyethyl (meth)acrylate.

Examples of the alkylene oxide having 2 to 4 carbon atoms added to the hydroxyalkyl (meth)acrylate (a11) having 4 to 12 carbon atoms include ethylene oxide, 1,2- or 1,3-propylene oxide, and 1,2-, 1,3-, 1,4- or 2,3-butylene oxide. In consideration of the conductivity of the electrolytic solution, the number of moles of such an alkylene oxide added is preferably 1 to 40 mol. For the alkylene oxides added, one type may be used alone or two or more types may be used in combination.

Examples of the adduct (a13) obtained by adding an alkylene oxide having 2 to 4 carbon atoms to the hydroxyalkyl (meth)acrylate (a11) having 4 to 12 carbon atoms include 2-(2-hydroxyethoxy)ethyl (meth)acrylate, 2-(2-(2-hydroxyethoxy)ethoxy)ethyl (meth)acrylate and an adduct obtained by adding 3.5 mol of ethylene oxide to 2-hydroxyethyl (meth)acrylate (polyethylene glycol monoacrylate).

Examples of the cyclic skeleton of the (meth)acrylate (a14) having a hydroxy group having 6 to 15 carbon atoms and a cyclic skeleton include an alicyclic skeleton and an aromatic ring skeleton.

Specific examples of the (meth)acrylate (a14) having a hydroxy group having 6 to 15 carbon atoms and a cyclic skeleton include 1,4-cyclohexanedimethanol monoacrylate and 3-hydroxy-1-(meth)acryloyloxyadamantane.

Examples of the adduct (a15) obtained by adding a lactone having 2 to 12 carbon atoms to the (meth)acrylate (a14) having a hydroxy group having 6 to 15 carbon atoms and a cyclic skeleton include an adduct obtained by adding 2 mol of caprolactone to 1,4-cyclohexanedimethanol monoacrylate.

Examples of the adduct (a16) obtained by adding an alkylene oxide having 2 to 4 carbon atoms to the (meth)acrylate (a14) having a hydroxy group having 6 to 15 carbon atoms and a cyclic skeleton include an adduct obtained by adding 3 mol of ethylene oxide to 1,4-cyclohexanedimethanol monoacrylate.

Among these, in consideration of a withstand voltage, (a1) is preferably a hydroxyalkyl (meth)acrylate (a11) having 4 to 12 carbon atoms, more preferably a monohydroxyalkyl (meth)acrylate (a111) having 4 to 12 carbon atoms and a dihydroxyalkyl (meth)acrylate (a112) having 4 to 12 carbon atoms, and particularly preferably 2-hydroxyethyl (meth)acrylate and glycerol mono (meth)acrylate.

Monomers other than the above monomers exemplified as the (meth)acrylic monomer (a1) having a hydroxy group can obtain an effect of improving a withstand voltage as long as they are (meth)acrylic monomers (a1) having a hydroxy group.

(Meth)acrylic monomers (a) constituting the polymer (A) in the present invention may further include the (meth)acrylic monomer (a2) having a carboxy group.

Specific examples of (a2) include an adduct (a21) obtained by adding an acid anhydride having 4 to 10 carbon atoms to the (meth)acrylic monomer (a1) having a hydroxy group and (meth)acrylic acid.

Examples of the acid anhydride having 4 to 10 carbon atoms added to (a1) include succinic anhydride, maleic anhydride, phthalic anhydride and hexahydrophthalic anhydride.

Specific examples of the adduct (a21) obtained by adding an acid anhydride having 4 to 10 carbon atoms to the (meth)acrylic monomer (a1) having a hydroxy group include 2-(meth)acryloyloxyethyl succinate such as a succinic anhydride adduct of 2-hydroxyethyl methacrylate, 2-(meth)acryloyloxyethyl maleate, 2-(meth)acryloyloxyethyl phthalate, and 2-(meth)acryloyloxyethyl hexahydrophthalate.

Among these, in consideration of a withstand voltage, (a2) is preferably (meth)acrylic acid and 2-(meth)acryloyloxyethyl succinate.

The polymer (A) in the present invention may include a monomer (a3) other than the (meth)acrylic monomer (a1) having a hydroxy group, and the (meth)acrylic monomer (a2) having a carboxy group.

Specific examples of the monomer (a3) include an alkyl (meth)acrylate having 4 to 20 carbon atoms [(methyl (meth)acrylate, ethyl (meth)acrylate, butyl (meth)acrylate, 2-ethylhexyl (meth)acrylate, lauryl (meth)acrylate, etc.;

an ether of a monomer having a (meth)acryloyl group and a hydroxy group and an alcohol having 1 to 8 carbon atoms (methanol, ethanol, propanol, butanol, octanol, etc.) [(2-methoxyethyl (meth)acrylate, 2-(2-methoxyethoxy)ethyl (meth)acrylate, 2-(2-ethoxyethoxy)ethyl (meth)acrylate, 2-(2-octoxyethoxy)ethyl, (meth)acrylate etc.];

a (meth)acrylamide having 3 to 20 carbon atoms [(meth)acrylamide, N,N-dimethyl (meth)acrylamide, N-isopropylacrylamide, and N,N-dibenzyl (meth)acrylamide]; and a (meth)acrylate having an acidic functional group (a phospho group, a sulfo group, etc.) other than a carboxy group [2-((meth)acryloyloxy)ethyl phosphate, 2-sulfoethyl (meth)acrylate, etc.].

Among these, the monomer (a3) is preferably an alkyl (meth)acrylate having 4 to 20 carbon atoms, and particularly preferably methyl (meth)acrylate, ethyl (meth)acrylate, propyl (meth)acrylate, butyl (meth)acrylate and 2-ethylhexyl (meth)acrylate.

For such monomers, one type may be used alone or two or more types may be used in combination.

The number average molecular weight (hereinafter referred to as Mn) of the polymer (A) is preferably 1,000 or more, more preferably 3,000 or more, and particularly preferably 5,000 or more.

In addition, Mn of the polymer (A) is preferably 100,000 or less, more preferably 80,000 or less, and particularly preferably 50,000 or less.

An Mn of 1,000 or more is preferable in consideration of a withstand voltage of the electrolytic solution. An Mn of 100,000 or less is preferable in consideration of impregnating properties of the electrolytic solution in an element.

Here, Mn in the present invention is a value measured by a gel permeation chromatography (GPC) method described in the examples.

In order to improve a withstand voltage, a glass transition temperature (hereinafter referred to as Tg) of the polymer (A) is preferably −100° C. or higher and more preferably −80° C. or higher.

In addition, in order to improve a withstand voltage, Tg of the polymer (A) is preferably 80° C. or lower, more preferably 60° C. or lower, and particularly preferably 55° C. or lower.

Tg of the present invention can be measured by a method according to "ASTM D3418-82" using a differential scanning calorimeter ["DSC20" and "SSC/580" commercially available from Seiko Instruments Inc.].

A mechanism by which a withstand voltage is improved by setting Tg of the polymer (A) to be within the above range is speculated to be as follows.

Since the polymer (A) having a Tg in the above range is a relatively flexible polymer, the adsorptivity with respect to a dielectric increases, and as a result, an effect of dielectric protection by the polymer (A) is further improved, and a withstand voltage is speculated to be improved.

As will be described below in detail, the polymer (A) can be obtained by polymerizing the (meth)acrylic monomer (a) using a known method.

While the electrolytic solution additive for an electrolytic capacitor (B) includes the polymer (A) as an essential constituent component, it may further include other additives as necessary.

Specific examples of other additives include a gas generation inhibitor (nitro compounds such as o-nitrobenzoic acid, p-nitrobenzoic acid, m-nitrobenzoic acid, o-nitrophenol and p-nitrophenol), and a withstand voltage improving agent (polyethylene glycol (Mn: 600 or more), polypropylene glycol, polyvinyl alcohol, and mannitol).

Among these, in order to improve a withstand voltage, a withstand voltage improving agent is preferably used, and mannitol is more preferably used.

In order to improve a withstand voltage, a weight proportion of the polymer (A) with respect to a total weight of the electrolytic solution additive for an electrolytic capacitor (B) is preferably 10 to 100 wt %, more preferably 30 to 100 wt %, particularly preferably 50 to 100 wt %, and most preferably 80 to 100 wt %.

The electrolytic solution additive for an electrolytic capacitor (B) including the polymer (A) can be synthesized by polymerizing the (meth)acrylic monomer (a) using a known method (the method described in Japanese Unexamined Patent Application Publication No. H5-117330 and the like). For example, a monomer such as the monomer (a) can be obtained by performing synthesis by a solution polymerization method in which the monomers are reacted with a radical initiator (azobisisobutyronitrile, etc.) in a solvent (toluene, etc.), and then distilling off the solvent used for polymerization by drying under a reduced pressure.

The other additives may be mixed with a solvent for synthesis or may be mixed with the polymer (A) after the solvent is distilled off.

Examples of the organic solvent (C) having a hydroxyl group concentration of higher than 10 mmol/g in the present invention include water and an alcohol solvent (methyl alcohol, ethyl alcohol, propyl alcohol, butyl alcohol, ethylene glycol, propylene glycol, etc.). Among these, in consideration of a low vapor pressure and excellent permeability in a capacitor element, ethylene glycol and propylene glycol are preferable, and ethylene glycol is more preferable.

In addition, in addition to the organic solvent (C), the electrolytic solution for an electrolytic capacitor of the present invention may further include an organic solvent having a hydroxyl group concentration of 10 mmol/g or less as long as the effects of the present invention are not impaired.

Examples of the organic solvent having a hydroxyl group concentration of 10 mmol/g or less include an alcohol solvent (ethylene glycol monobutyl ether, and polyethylene glycol (Mn: less than 600), etc.), an amide solvent (N-methylformamide and N,N-dimethylformamide, etc.), a lactone solvent (α-acetyl-γ-butyrolactone, β-butyrolactone, γ-butyrolactone, γ-valerolactone and δ-valerolactone, etc.), a nitrile solvent (acetonitrile, propionitrile, butyronitrile, acrylonitrile, methacrylonitrile and benzonitrile, etc.), a sulfoxide solvent (dimethyl sulfoxide, methylethyl sulfoxide and diethyl sulfoxide), and a sulfone solvent (sulfolane and ethyl methyl sulfone, etc.).

Among these, a lactone solvent, a sulfoxide solvent and a sulfone solvent are preferably used.

For the organic solvent (C), one type may be used alone or two or more types may be used in combination.

The organic solvent (C) preferably includes ethylene glycol as an essential component. In addition, when the organic solvent (C) includes a solvent other than ethylene glycol, a weight proportion of ethylene glycol with respect to the total weight of the organic solvent (C) is preferably 10 to 100 wt % and more preferably 30 to 100 wt %.

As the electrolyte (D) included in the electrolytic solution for an electrolytic capacitor of the present invention, a known electrolyte that is generally used for a electrolytic solution for an electrolytic capacitor can be used, and an electrolyte including carboxylate, ammonium or amidinium ions is preferable.

Examples of carboxylate ions include anions obtained by removing a hydrogen atom from a carboxy group of a carboxylic acid, such as a saturated polycarboxylic acid (oxalic acid, malonic acid, succinic acid, glutaric acid, adipic acid, pimelic acid, suberic acid, azelaic acid, 2-methylazelaic acid, sebacic acid, 1,5-octanedicarboxylic acid, 4,5-octanedicarboxylic acid, 1,9-nonanedicarboxylic acid, 1,10-decanedicarboxylic acid, 1,6-decanedicarboxylic acid, 5,6-decanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,15-pentadecanedicarboxylic acid, methylmalonic acid, ethylmalonic acid, propylmalonic acid, butylmalonic acid, pentylmalonic acid, hexylmalonic acid, dimethylmalonic acid, diethylmalonic acid, methylpropylmalonic acid, methylbutylmalonic acid, ethylpropylmalonic acid, dipropylmalonic acid, methylsuccinic acid, ethylsuccinic acid, 2,2- dimethylsuccinic acid, 2,3-dimethylsuccinic acid, 2-methylglutaric acid, 3-methylglutaric acid, 3-methyl-3-ethylglutaric acid, 3,3-diethylglutaric acid, 3,3-dimethylglutaric acid and 3-methyladipic acid, etc.);

a saturated monocarboxylic acid (formic acid, acetic acid, propionic acid, butyric acid, isobutyric acid, valeric acid, caproic acid, enanthic acid, caprylic acid, pelargonic acid, lauric acid, myristic acid, stearic acid, behenic acid and undecanoic acid, etc.);

an unsaturated monocarboxylic acid [(meth)acrylic acid, crotonic acid, and oleic acid, etc.];

an unsaturated aliphatic polycarboxylic acid (maleic acid, fumaric acid, itaconic acid and citraconic acid, etc.);

an aromatic monocarboxylic acid (benzoic acid, cinnamic acid, naphthoic acid, toluic acid, ethylbenzoic acid, propylbenzoic acid, isopropylbenzoic acid, butylbenzoic acid, isobutylbenzoic acid, sec-butylbenzoic acid, tert-butylbenzoic acid, hydroxybenzoic acid, ethoxybenzoic acid, propoxybenzoic acid, isopropoxybenzoic acid, butoxybenzoic acid, isobutoxybenzoic acid, sec-butoxybenzoic acid, tert-butoxybenzoic acid, aminobenzoic acid, N-methyl aminobenzoic acid, N-ethyl aminobenzoic acid, N-propyl aminobenzoic acid, N-isopropylaminobenzoic acid, N-butylaminobenzoic acid, N-isobutylaminobenzoic acid, N-sec-butylaminobenzoic acid, N-tert-butylaminobenzoic acid, N,N-dimethylaminobenzoic acid, and N,N-diethylaminobenzoic acid, etc.); and an aromatic polycarboxylic acid (phthalic acid, isophthalic acid, and terephthalic acid, etc.).

Among these, in consideration of a withstand voltage, an anion obtained by removing a hydrogen atom from a carboxy group of a saturated polycarboxylic acid and an unsaturated polycarboxylic acid is preferable.

Any ammonium can be used without particular limitation as long as the ammonium forms a salt with carboxylate ions.

Examples of ammonium include unsubstituted ammonium, primary ammonium (methylammonium, ethylammonium, propylammonium and isopropylammonium, etc.), secondary ammonium (dimethylammonium, diethylammonium, methylethylammonium, methylpropylammonium and methylisopropylammonium, etc.), tertiary ammonium (trimethylammonium, triethylammonium, dimethylethylammonium, dimethylpropylammonium and dimethylisopropylammonium, etc.) and quaternary ammonium (tetramethylammonium, ethyltrimethylammonium, diethyldimethylammonium, triethylmethylammonium, tetraethylammonium, etc.).

Any amidinium can be used without particular limitation as long as the amidinium forms a salt with carboxylate ions.

Examples of amidinium include imidazolinium and cations in which hydrogen atoms of imidazolinium are substituted with an alkyl group (1,2,3,4-tetramethylimidazolinium, 1,3,4-trimethyl-2-ethylimidazolinium, 1,3-dimethyl-2,4-diethylimidazolinium, and 1,2-dimethyl-3,4-diethylimidazolinium, etc.), and imidazolium and cations in which hydrogen atoms of imidazolium are substituted with an alkyl group (1,3-dimethylimidazolium, 1,3-diethylimidazolium, 1-ethyl-3-methylimidazolium, and 1,2,3-trimethylimidazolium, etc.).

Among ammonium and amidinium, in consideration of a withstand voltage, ammonium is preferable, and unsubstituted ammonium, primary ammonium and tertiary ammonium are more preferable.

The electrolytic solution for an electrolytic capacitor of the present invention may include a boric acid compound (E) as necessary.

Examples of the boric acid compound (E) include boric acid and a borate ester.

Examples of the borate ester include an alkyl borate (triethyl borate, etc.) and an aryl borate (triphenyl borate, etc.).

Among these, in consideration of a withstand voltage, boric acid is preferable.

In the electrolytic solution for an electrolytic capacitor of the present invention, a weight proportion of the electrolytic solution additive for an electrolytic capacitor (B) with respect to a total weight of the electrolytic solution for an electrolytic capacitor is preferably 0.5 to 40 wt %, more preferably 1 to 30 wt %, and particularly preferably 5 to 20 wt %.

When 0.5 wt % or more of the electrolytic solution additive for an electrolytic capacitor (B) is included, a withstand voltage is favorable. When 40 wt % or less of the electrolytic solution additive for an electrolytic capacitor (B) is included, the conductivity is favorable.

In consideration of the conductivity, a weight proportion of the organic solvent (C) with respect to a total weight of the electrolytic solution for an electrolytic capacitor is preferably 50 to 99 wt % and more preferably 60 to 80 wt %.

In consideration of the conductivity, a weight proportion of the electrolyte (D) with respect to a total weight of the electrolytic solution for an electrolytic capacitor is preferably 0.5 to 40 wt %, and more preferably 5 to 30 wt %.

In consideration of a withstand voltage, a weight proportion of the boric acid compound (E) with respect to a total weight of the electrolytic solution for an electrolytic capacitor is preferably 0 to 10 wt %, and more preferably 0.5 to 5 wt %.

A method of producing an electrolytic solution for an electrolytic capacitor of the present invention is not particularly limited. For example, the organic solvent (C) having a hydroxyl group concentration of higher than 10 mmol/g, the electrolytic solution additive for an electrolytic capacitor (B), and the electrolyte (D), and the boric acid compound (E) as necessary can be uniformly mixed together in a temperature range of 20 to 80° C. using a known mechanical mixing method (for example, a method using a mechanical stirrer or a magnetic stirrer) for production.

The electrolytic capacitor of the present invention such as an aluminum electrolytic capacitor may include the electrolytic solution for an electrolytic capacitor of the present invention and the form, the size, and the like of the electrolytic capacitor are not limited. The electrolytic capacitor of the present invention may be, for example, a winding type electrolytic capacitor, which is a capacitor formed by winding an anode (aluminum oxide foil) in which aluminum oxide is formed on a surface of the anode and a cathode aluminum foil with a separator therebetween.

The electrolytic capacitor of the present invention such as an aluminum electrolytic capacitor can be obtained when, for example, the electrolytic solution for an electrolytic capacitor of the present invention as an electrolytic solution for driving is impregnated into a separator (Kraft paper, Manila paper, or the like), and is accommodated in a bottomed cylindrical aluminum case together with anode and cathode, and an opening of the aluminum case is then sealed with sealing rubber (butyl rubber, silicone rubber, or the like).

EXAMPLES

While the present invention will be described below in detail with reference to examples, the present invention is not limited to such examples.

Here, "parts" in the following description indicate parts by weight.

In addition, Mn of the polymer (A) synthesized in production examples and comparative production examples was measured according to GPC under the following conditions.

Device (an example): HLC-8120 commercially available from TOSOH Corporation

Column (an example): TSK GEL GMH6, two columns [commercially available from TOSOH Corporation]

Measurement temperature: 40° C.

Sample solution: 0.25 wt % in THF solution

Amount of solution injected: 100 μl

Detection device: refractive index detector

Reference material: polystyrene standards (TSKstandard POLYSTYRENE) commercially available from TOSOH Corporation 12 points (weight average molecular weights: 500, 1,050, 2,800, 5,970, 9,100, 18,100, 37,900, 96,400, 190,000, 355,000, 1,090,000, and 2,890,000)

In addition, Tg of the polymer (A) synthesized in production examples and comparative production examples was measured using a differential scanning calorimeter ["DSC20" and "SSC/580" commercially available from Seiko Instruments Inc.] by a method according to "ASTM D3418-82."

Synthesis of Polymer (A)

Production Example 1: Synthesis of Polymer (A-1)

30 parts of methyl isobutyl ketone [commercially available from Wako Pure Chemical Industries, Ltd.] and 14.1 parts of polyethylene glycol monoacrylate [Blemmer AE-200, commercially available from NOF Corporation] were put into a flask including a stirrer, a thermometer and a cooling pipe attached thereto and heated to 80° C. A solution prepared in advance in which 0.9 parts of azobisisobutyronitrile [commercially available from Wako Pure Chemical Industries, Ltd.] was dissolved in 5 parts of methyl isobutyl ketone was added dropwise thereto over 3 hours. After dropwise addition was completed, the mixture was additionally heated for 3 hours. Then, methyl isobutyl ketone was distilled off under reduced pressure conditions of 0.5 kPa at 100° C., and thereby a polymer (A-1) was synthesized.

Production Example 2: Synthesis of Polymer (A-2)

A polymer (A-2) was synthesized in the same manner as in Production Example 1 except that an amount of methyl isobutyl ketone input in Production Example 1 was changed from 30 parts to 20 parts.

Production Example 3: Synthesis of Polymer (A-3)

A polymer (A-3) was synthesized in the same manner as in Production Example 1 except that an amount of methyl isobutyl ketone input in Production Example 1 was changed from 30 parts to 15 parts, and an amount of azobisisobutyronitrile input was changed from 0.9 parts to 0.5 parts.

Production Example 4: Synthesis of Polymer (A-4)

A polymer (A-4) was synthesized in the same manner as in Production Example 1 except that, in place of polyethylene glycol monoacrylate in Production Example 1, 9.0 parts of 2-hydroxyethyl methacrylate [commercially available from Wako Pure Chemical Industries, Ltd.], 2.6 parts of methacrylic acid [commercially available from Wako Pure Chemical Industries, Ltd.] and 2.6 parts of methyl methacrylate [commercially available from Wako Pure Chemical Industries, Ltd.] were used.

Production Example 5: Synthesis of Polymer (A-5)

A polymer (A-5) was synthesized in the same manner as in Production Example 1 except that, in place of polyethylene glycol monoacrylate in Production Example 1, 14.1 parts of 2-hydroxyethyl methacrylate [commercially available from Wako Pure Chemical Industries, Ltd.] was used.

Production Example 6: Synthesis of Polymer (A-6)

A polymer (A-6) was synthesized in the same manner as in Production Example 1 except that, in place of polyethylene glycol monoacrylate in Production Example 1, 14.1 parts of 2-hydroxyethyl acrylate [commercially available from Wako Pure Chemical Industries, Ltd.] was used.

Production Example 7: Synthesis of Polymer (A-7)

A polymer (A-7) was synthesized in the same manner as in Production Example 1 except that, in place of polyethylene glycol monoacrylate in Production Example 1, 14.1 parts of glycerol monoacrylate [Blemmer GLM, commercially available from NOF Corporation] was used.

Production Example 8: Synthesis of Polymer (A-8)

A polymer (A-8) was synthesized in the same manner as in Production Example 1 except that, in place of polyethylene glycol monoacrylate in Production Example 1, 14.1 parts of 1,4-cyclohexanedimethanol monoacrylate [Fancryl FA-610A, commercially available from Hitachi Chemical Co., Ltd.] was used.

Production Example 9: Synthesis of Polymer (A-9)

A polymer (A-9) was synthesized in the same manner as in Production Example 1 except that, in place of polyethylene glycol monoacrylate in Production Example 1, 14.1 parts of an adduct obtained by adding 2 mol of caprolactone to 2-hydroxyethyl acrylate [SR-495B, commercially available from Sartomer] was used.

Production Example 10: Synthesis of Polymer (A-10)

A polymer (A-10) was synthesized in the same manner as in Production Example 1 except that, in place of polyethylene glycol monoacrylate in Production Example 1, 9.0 parts of 2-hydroxyethyl methacrylate [commercially available from Wako Pure Chemical Industries, Ltd.] and 5.1 parts of a succinic anhydride adduct of 2-hydroxyethyl methacrylate [Light Ester HO-MS(N), commercially available from Kyoeisha Chemical Co., Ltd.] were used.

Production Example 11: Synthesis of Polymer (A-11)

A polymer (A-11) was synthesized in the same manner as in Production Example 1 except that, in place of polyethylene glycol monoacrylate in Production Example 1, 9.0 parts of 2-hydroxyethyl methacrylate [commercially available from Wako Pure Chemical Industries, Ltd.] and 5.1 parts of methacrylic acid [commercially available from Wako Pure Chemical Industries, Ltd.] were used.

Production Example 12: Synthesis of Polymer (A-12)

A polymer (A-12) was synthesized in the same manner as in Production Example 1 except that, in place of polyethylene glycol monoacrylate in Production Example 1, 9.0 parts of glycerol monoacrylate [Blemmer GLM, commercially available from NOF Corporation] and 5.1 parts of methacrylic acid [commercially available from Wako Pure Chemical Industries, Ltd.] were used.

Production Example 13: Synthesis of Polymer (A-13)

A polymer (A-13) was synthesized in the same manner as in Production Example 1 except that, in place of polyethylene glycol monoacrylate in Production Example 1, 9.0 parts of 1,4-cyclohexanedimethanol monoacrylate [Fancryl FA-610A, commercially available from Hitachi Chemical Co., Ltd.] and 5.1 parts of methacrylic acid [commercially available from Wako Pure Chemical Industries, Ltd.] were used.

Production Example 14: Synthesis of Polymer (A-14)

A polymer (A-14) was synthesized in the same manner as in Production Example 1 except that, in place of polyethylene glycol monoacrylate in Production Example 1, 9.0 parts of 2-hydroxyethyl acrylate [commercially available from Wako Pure Chemical Industries, Ltd.] and 5.1 parts of methacrylic acid [commercially available from Wako Pure Chemical Industries, Ltd.] were used.

Comparative Production Example 1: Synthesis of Polymer (A'-1)

A comparative polymer (A'-1) was synthesized in the same manner as in Production Example 1 except that, in place of polyethylene glycol monoacrylate in Production Example 1, 14.1 parts of acrylic acid [commercially available from Wako Pure Chemical Industries, Ltd.] was used.

Comparative Production Example 2: Synthesis of Polymer (A'-2)

A comparative polymer (A'-2) was synthesized in the same manner as in Production Example 1 except that, in place of polyethylene glycol monoacrylate in Production Example 1, 7.1 parts of acrylic acid [commercially available from Wako Pure Chemical Industries, Ltd.] and 7.1 parts of 2-hydroxyethyl acrylate were used.

Mn, Tg, and the like of the polymers (A-1) to (A-14) and the comparative polymers (A'-1) to (A'-2) are shown in Table 1.

TABLE 1

| | | | Production Examples | | | | | | | |
|---|---|---|---|---|---|---|---|---|---|---|
| | | | 1 | 2 | 3 | 4 | 5 | 6 | 7 | 8 |
| | | | Polymer (A) | | | | | | | |
| | | | (A-1) | (A-2) | (A-3) | (A-4) | (A-5) | (A-6) | (A-7) | (A-8) |
| Monomers constituting Polymer (A) (wt %) | (Meth)acrylic monomer (a1) having a hydroxy group | Polyethylene glycol monoacrylate | 100 | 100 | 100 | — | — | — | — | — |
| | | 2-Hydroxyethyl methacrylate | — | — | — | 64 | 100 | — | — | — |
| | | 2-Hydroxyethyl acrylate | — | — | — | — | — | 100 | — | — |
| | | Glycerol monoacrylate | — | — | — | — | — | — | 100 | — |
| | | 1,4-Cyclohexanedimethanol monoacrylate | — | — | — | — | — | — | — | 100 |
| | | Adduct obtained by adding 2 mol of caprolactone to 2-hydroxyethyl acrylate | — | — | — | — | — | — | — | — |
| | (Meth)acrylic monomer (a2) having a carboxy group | Methacrylic acid | — | — | — | 18 | — | — | — | — |
| | | Succinic anhydride adduct of 2-hydroxyethyl methacrylate | — | — | — | — | — | — | — | — |
| | | Acrylic acid | — | — | — | — | — | — | — | — |
| | Other monomer (a3) | Methyl (meth)acrylate | — | — | — | 18 | — | — | — | — |
| Content (wt %) of (meth)acrylic monomer (a1) having a hydroxy group | | | 100 | 100 | 100 | 64 | 100 | 100 | 100 | 100 |
| Number average molecular weight Mn | | | 6,800 | 12,000 | 58,000 | 4,100 | 4,500 | 3,900 | 3,600 | 7,500 |
| Glass transition temperature (° C.) | | | −50 | −50 | −50 | 65 | 55 | −15 | 30 | 18 |

TABLE 1-continued

|  |  |  | Production Examples |  |  |  |  |  | Comparative Production Examples |  |
|---|---|---|---|---|---|---|---|---|---|---|
|  |  |  | 9 | 10 | 11 | 12 | 13 | 14 | 1 | 2 |
|  |  |  | \multicolumn{8}{c}{Polymer (A)} |
|  |  |  | (A-9) | (A-10) | (A-11) | (A-12) | (A-13) | (A-14) | (A'-1) | (A'-2) |
| Monomers constituting Polymer (A) (wt %) | (Meth)acrylic monomer (a1) having a hydroxy group | Polyethylene glycol monoacrylate | — | — | — | — | — | — | — | — |
|  |  | 2-Hydroxyethyl methacrylate | — | 84 | 64 | — | — | — | — | 50 |
|  |  | 2-Hydroxyethyl acrylate | — | — | — | — | — | 64 | — | — |
|  |  | Glycerol monoacrylate | — | — | — | 64 | — | — | — | — |
|  |  | 1,4-Cyclohexanedimethanol monoacrylate | — | — | — | — | 64 | — | — | — |
|  |  | Adduct obtained by adding 2 mol of caprolactone to 2-hydroxyethyl acrylate | 100 | — | — | — | — | — | — | — |
|  | (Meth)acrylic monomer (a2) having a carboxy group | Methacrylic acid | — | — | 36 | 36 | 36 | 36 | — | — |
|  |  | Succinic anhydride adduct of 2-hydroxyethyl methacrylate | — | 36 | — | — | — | — | — | — |
|  |  | Acrylic acid | — | — | — | — | — | — | 100 | 50 |
|  | Other monomer (a3) | Methyl (meth)acrylate | — | — | — | — | — | — | — | — |
| Content (wt %) of (meth)acrylic monomer (a1) having a hydroxy group |  |  | 100 | 64 | 64 | 64 | 64 | 64 | 0 | 50 |
| Number average molecular weight Mn |  |  | 7,000 | 4,200 | 6,000 | 5,600 | 6,300 | 5,800 | 7,000 | 6,500 |
| Glass transition temperature (° C.) |  |  | −50 | 10 | 82 | 63 | 55 | 26 | 106 | 85 |

Preparation of Electrolyte (D)

Production Example 15

80 parts of methanol and 20 parts of 1,6-decanedicarboxylic acid were put into a 300 ml beaker and 2.5 parts of ammonia gas was blown thereinto for neutralization. Then, methanol was removed under reduced pressure conditions (0.5 kPa) at 80° C., and 22.2 parts of diammonium 1,6-decanedicarboxylate salt was obtained.

Preparation of Electrolytic Solution

Examples 1 to 18, and Comparative Examples 1 to 3

The polymers (A-1) to (A-14) as the polymer (A) synthesized in the above production examples or the comparative polymers (A'-1) to (A'-2) synthesized in the comparative production examples, diammonium 1,6-decanedicarboxylate salt as the electrolyte (D) produced in Production Example 15, and ethylene glycol (hydroxyl group concentration: 32 mmol/g) or propylene glycol (hydroxyl group concentration: 26 mmol/g) as the organic solvent (C), and boric acid as the boric acid compound (E) as necessary were added in parts shown in Table 1 to prepare electrolytic solutions of Examples 1 to 18 and electrolytic solutions of Comparative Examples 1 to 3. In addition, evaluation was performed according to the following methods. The results are shown in Table 2.

TABLE 2

| Electrolytic solution for electrolytic capacitor |  |  | Examples |  |  |  |  |  |  |
|---|---|---|---|---|---|---|---|---|---|
|  |  |  | 1 | 2 | 3 | 4 | 5 | 6 | 7 |
| Formulation (parts by weight) | Additive (B) | Polymer (A-1) | 10 | — | — | — | — | — | — |
|  |  | Polymer (A-2) | — | 10 | — | — | — | — | — |
|  |  | Polymer (A-3) | — | — | 10 | — | — | — | — |
|  |  | Polymer (A-4) | — | — | — | 10 | — | — | — |
|  |  | Polymer (A-5) | — | — | — | — | 10 | — | — |
|  |  | Polymer (A-6) | — | — | — | — | — | 10 | — |
|  |  | Polymer (A-7) | — | — | — | — | — | — | 10 |
|  |  | Polymer (A-8) | — | — | — | — | — | — | — |
|  |  | Polymer (A-9) | — | — | — | — | — | — | — |
|  |  | Polymer (A-10) | — | — | — | — | — | — | — |
|  |  | Polymer (A-11) | — | — | — | — | — | — | — |
|  |  | Polymer (A-12) | — | — | — | — | — | — | — |
|  |  | Polymer (A-13) | — | — | — | — | — | — | — |
|  |  | Polymer (A-14) | — | — | — | — | — | — | — |
|  |  | Polymer (A'-1) | — | — | — | — | — | — | — |
|  |  | Polymer (A'-2) | — | — | — | — | — | — | — |

TABLE 2-continued

| | | | | | | | | | |
|---|---|---|---|---|---|---|---|---|---|
| | Organic solvent (C) | Ethylene glycol | 80 | 80 | 80 | 80 | 80 | 80 | 80 |
| | | Propylene glycol | — | — | — | — | — | — | — |
| | Electrolyte (D) | Diammonium 1,6-decanedicarboxylate salt | 10 | 10 | 10 | 10 | 10 | 10 | 10 |
| | Boric acid compound (E) | Boric acid | — | — | — | — | — | — | — |
| Performance evaluation | | Conductivity (mS/cm) | 1.7 | 1.6 | 1.5 | 1.3 | 1.5 | 1.4 | 1.5 |
| | | Sparking voltage (withstand voltage) (V) | 550 | 550 | 550 | 490 | 550 | 560 | 550 |

| | | | Examples | | | | | | |
|---|---|---|---|---|---|---|---|---|---|
| Electrolytic solution for electrolytic capacitor | | | 8 | 9 | 10 | 11 | 12 | 13 | 14 |
| Formulation (parts by weight) | Additive (B) | Polymer (A-1) | — | — | — | — | — | — | — |
| | | Polymer (A-2) | — | — | — | — | — | — | — |
| | | Polymer (A-3) | — | — | — | — | — | — | — |
| | | Polymer (A-4) | — | — | — | — | — | — | — |
| | | Polymer (A-5) | — | — | — | — | — | — | — |
| | | Polymer (A-6) | — | — | — | — | — | — | — |
| | | Polymer (A-7) | — | — | — | — | — | — | — |
| | | Polymer (A-8) | 10 | — | — | — | — | — | — |
| | | Polymer (A-9) | — | 10 | — | — | — | — | — |
| | | Polymer (A-10) | — | — | 10 | — | — | — | — |
| | | Polymer (A-11) | — | — | — | 10 | — | — | — |
| | | Polymer (A-12) | — | — | — | — | 10 | — | — |
| | | Polymer (A-13) | — | — | — | — | — | 10 | — |
| | | Polymer (A-14) | — | — | — | — | — | — | 10 |
| | | Polymer (A'-1) | — | — | — | — | — | — | — |
| | | Polymer (A'-2) | — | — | — | — | — | — | — |
| | Organic solvent (C) | Ethylene glycol | 80 | 80 | 80 | 80 | 80 | 80 | 80 |
| | | Propylene glycol | — | — | — | — | — | — | — |
| | Electrolyte (D) | Diammonium 1,6-decanedicarboxylate salt | 10 | 10 | 10 | 10 | 10 | 10 | 10 |
| | Boric acid compound (E) | Boric acid | — | — | — | — | — | — | — |
| Performance evaluation | | Conductivity (mS/cm) | 1.6 | 1.4 | 1.4 | 1.4 | 1.2 | 1.3 | 1.3 |
| | | Sparking voltage (withstand voltage) (V) | 560 | 550 | 540 | 470 | 480 | 540 | 540 |

| | | | Examples | | | | Comparative Examples | | |
|---|---|---|---|---|---|---|---|---|---|
| Electrolytic solution for electrolytic capacitor | | | 15 | 16 | 17 | 18 | 1 | 2 | 3 |
| Formulation (parts by weight) | Additive (B) | Polymer (A-1) | 10 | 10 | — | — | — | — | — |
| | | Polymer (A-2) | — | — | — | — | — | — | — |
| | | Polymer (A-3) | — | — | — | — | — | — | — |
| | | Polymer (A-4) | — | — | — | — | — | — | — |
| | | Polymer (A-5) | — | — | — | — | — | — | — |
| | | Polymer (A-6) | — | — | 0.5 | 40 | — | — | — |
| | | Polymer (A-7) | — | — | — | — | — | — | — |
| | | Polymer (A-8) | — | — | — | — | — | — | — |
| | | Polymer (A-9) | — | — | — | — | — | — | — |
| | | Polymer (A-10) | — | — | — | — | — | — | — |
| | | Polymer (A-11) | — | — | — | — | — | — | — |
| | | Polymer (A-12) | — | — | — | — | — | — | — |
| | | Polymer (A-13) | — | — | — | — | — | — | — |
| | | Polymer (A-14) | — | — | — | — | — | — | — |
| | | Polymer (A'-1) | — | — | — | — | — | 10 | — |
| | | Polymer (A'-2) | — | — | — | — | — | — | 10 |
| | Organic solvent (C) | Ethylene glycol | 80 | — | 89.5 | 50 | 90 | 80 | 80 |
| | | Propylene glycol | — | 80 | — | — | — | — | — |
| | Electrolyte (D) | Diammonium 1,6-decanedicarboxylate salt | 10 | 10 | 10 | 10 | 10 | 10 | 10 |
| | Boric acid compound (E) | Boric acid | 2 | — | — | — | — | — | — |
| Performance evaluation | | Conductivity (mS/cm) | 1.6 | 1.2 | 1.7 | 1.0 | 2.1 | 0.8 | 0.9 |
| | | Sparking voltage (withstand voltage) (V) | 570 | 540 | 500 | 570 | 380 | 450 | 430 |

<Conductivity>

The conductivity of the electrolytic solutions at 30° C. of examples and comparative examples was measured using an electrical conductivity meter CM-40S [commercially available from DKK-TOA Corporation].

<Sparking Voltage>

A 10 cm$^2$ high pressure chemical etching aluminum foil was used as an anode, a 10 cm$^2$ plain aluminum foil was used as a cathode, and the electrolytic solution of examples and comparative examples was used as an electrolytic solution. Next, a load was applied at 25° C. according to constant current method (2 mA) using a constant voltage and constant current DC power supply device [GP0650-05R commercially available from Takasago Ltd.] and a voltage was measured. With a horizontal axis representing time, a voltage was plotted on a vertical axis. A rising curve of the voltage with the elapse of time was observed. A voltage when a disturbance in the rising curve due to sparking or scintillation first occurred was set as a sparking voltage. A higher sparking voltage indicated a higher withstand voltage.

The electrolytic solutions of Examples 1 to 18 of the present invention exhibited an excellent withstand voltage and conductivity.

On the other hand, the electrolytic solution of Comparative Example 2 had an improved withstand voltage compared to Comparative Example 1 in which no additive was added, but the conductivity greatly decreased. This is thought to have been caused by the fact that many carboxy groups contained in the polymer (A'-1) inhibited movement of anions. In addition, Comparative Example 3 in which a content of the (meth)acrylic monomer (a1) having a hydroxy group was less than 60 wt % with respect to the weight of all monomers did not have a sufficient effect of improving a withstand voltage. This is thought to have been caused by the fact that there was a small number of hydroxy groups in a molecule.

INDUSTRIAL APPLICABILITY

Since the electrolytic capacitor using the electrolytic solution for an electrolytic capacitor of the present invention uses an electrolytic solution having a high withstand voltage while high conductivity is maintained, it can be suitably used as a component of electrical appliances and electronic products for which a high drive voltage is required.

The electrolytic solution for an electrolytic capacitor of the present invention is particularly suitable as an electrolytic solution for an electrolytic capacitor for mobile applications such as a laptop and automotive applications.

The invention claimed is:

1. An electrolytic solution for an electrolytic capacitor which is an electrolytic solution for an electrolytic capacitor comprising an electrolytic solution additive for an electrolytic capacitor (B) including a polymer (A) containing a (meth)acrylic monomer (a) as an essential constituent component, an organic solvent (C) having a hydroxyl group concentration of higher than 10 mmol/g and an electrolyte (D) and in which a content of a (meth)acrylic monomer (a1) having a hydroxy group is 100 wt % with respect to a total weight of all monomers constituting the polymer (A), wherein a number average molecular weight of the polymer (A) is 1,000 to 100,000.

2. The electrolytic solution for an electrolytic capacitor according to claim 1, wherein the (meth)acrylic monomer (a1) having a hydroxy group is at least one monomer selected from the group consisting of a hydroxyalkyl (meth)acrylate (a11) having 4 to 12 carbon atoms, an adduct (a12) obtained by adding a lactone having 2 to 12 carbon atoms to the hydroxyalkyl (meth)acrylate (a11) having 4 to 12 carbon atoms, and an adduct (a13) obtained by adding an alkylene oxide having 2 to 4 carbon atoms to the hydroxyalkyl (meth)acrylate (a11) having 4 to 12 carbon atoms.

3. The electrolytic solution for an electrolytic capacitor according to claim 1, further comprising a boric acid compound (E).

4. An electrolytic capacitor comprising:
an anode, a cathode, and a separator disposed between the anode and the cathode, wherein the electrolytic solution for the electrolytic capacitor according to claim 1 is impregnated into the separator.

5. An electrolytic solution for an electrolytic capacitor which is an electrolytic solution for an electrolytic capacitor comprising an electrolytic solution additive for an electrolytic capacitor (B) including a polymer (A) containing a (meth)acrylic monomer (a) as an essential constituent component, an organic solvent (C) having a hydroxyl group concentration of higher than 10 mmol/g and an electrolyte (D),
the (meth)acrylic monomer (a) constituting the polymer (A) consists of a (meth)acrylic monomer (a1) having a hydroxy group and a (meth)acrylic monomer (a2) having a carboxy group, or consists of the (meth)acrylic monomer (a1) having a hydroxy group, the (meth)acrylic monomer (a2) having a carboxy group, and another monomer (a3) other than the (meth)acrylic monomer (a1) having a hydroxy group and the (meth)acrylic monomer (a2) having a carboxy group,
wherein the another monomer (a3) is selected from a group consisting of an alkyl (meth)acrylate having 4 to 20 carbon atoms, an ether of a monomer having a (meth)acryloyl group and a hydroxy group and an alcohol having 1 to 8 carbon atoms, a (meth)acrylamide having 3 to 20 carbon atoms, and a (meth)acrylate having an acidic functional group other than a carboxy group,
a content of the (meth)acrylic monomer (a1) having a hydroxy group is 60 wt % or more to less than 100 wt % with respect to a total weight of all monomers constituting the polymer (A), and
a number average molecular weight of the polymer (A) is 1,000 to 100,000.

6. The electrolytic solution for an electrolytic capacitor according to claim 4,
wherein the (meth)acrylic monomer (a2) having a carboxy group is (meth)acrylic acid and/or an adduct (a21) obtained by adding an acid anhydride having 4 to 10 carbon atoms to the (meth)acrylic monomer (a1) having a hydroxy group.

* * * * *